(12) United States Patent
Zheng et al.

(10) Patent No.: US 11,834,964 B2
(45) Date of Patent: Dec. 5, 2023

(54) LOW RADIUS RATIO FAN BLADE FOR A GAS TURBINE ENGINE

(71) Applicant: General Electric Company, Schenectady, NY (US)

(72) Inventors: Li Zheng, Niskayuna, NY (US); Scott Roger Finn, Evendale, OH (US); Nicholas J. Kray, West Chester, OH (US); Trevor H. Wood, Clifton Park, NY (US); Kishore Ramakrishnan, Rexford, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 17/535,291

(22) Filed: Nov. 24, 2021

(65) Prior Publication Data
US 2023/0160312 A1    May 25, 2023

(51) Int. Cl.
*F01D 5/30*    (2006.01)
*F01D 5/28*    (2006.01)

(52) U.S. Cl.
CPC .......... *F01D 5/3007* (2013.01); *F01D 5/282* (2013.01); *F05D 2220/32* (2013.01); *F05D 2230/60* (2013.01); *F05D 2240/30* (2013.01)

(58) Field of Classification Search
CPC .......... F01D 5/3007; F01D 5/30; F01D 5/282
USPC ...................................... 416/219 R
See application file for complete search history.

(56) References Cited

U.S. PATENT DOCUMENTS

| | | | |
|---|---|---|---|
| 4,453,890 A | 6/1984 | Brantley | |
| 4,595,340 A | 6/1986 | Klassen et al. | |
| 5,067,876 A | 11/1991 | Moreman, III | |
| 6,190,133 B1* | 2/2001 | Ress, Jr. | F01D 5/28 416/241 R |
| 6,481,971 B1 | 11/2002 | Forrester | |
| 7,153,102 B2* | 12/2006 | Stone | F01D 5/02 416/244 R |
| 7,476,086 B2* | 1/2009 | Wadia | F01D 5/141 416/223 R |
| 8,568,101 B2* | 10/2013 | Fujimura | F01D 5/3007 416/204 A |
| 9,239,062 B2 | 1/2016 | Lamboy et al. | |
| 9,617,860 B2* | 4/2017 | Lattanzio | F01D 5/3007 |

(Continued)

FOREIGN PATENT DOCUMENTS

| | | |
|---|---|---|
| CH | 264094 | 9/1949 |
| FR | 2568308 | 1/1986 |
| FR | 2112278 | 5/2023 |

*Primary Examiner* — Michael L Sehn
(74) *Attorney, Agent, or Firm* — HANLEY, FLIGHT & ZIMMERMAN, LLC

(57) ABSTRACT

Methods, apparatus, systems, and articles of manufacture are disclosed to implement a low radius ratio fan blade for a gas turbine engine. A fan blade for a gas turbine engine includes an airfoil including a leading edge and a trailing edge extending between a root and a tip of the airfoil, a distance between the leading edge and the trailing edge defining a flow path length, a leading edge hub point defined by a radially innermost point of the leading edge, and an axial dovetail including a pair of opposed pressure faces, an axial length of the axial dovetail less than the flow path length, a top edge of the axial dovetail separating the pressure faces from the airfoil, the top edge of the axial dovetail radially outward of the leading edge hub point.

21 Claims, 5 Drawing Sheets

(56) References Cited

U.S. PATENT DOCUMENTS

| | | | |
|---|---|---|---|
| 10,443,411 B2 * | 10/2019 | Veitch | F01D 5/26 |
| 10,589,475 B2 | 3/2020 | Kray et al. | |
| 10,815,786 B2 | 10/2020 | Hafner et al. | |
| 10,837,290 B2 | 11/2020 | Lee et al. | |
| 2014/0311149 A1 | 10/2014 | Chuang et al. | |
| 2015/0361798 A1 * | 12/2015 | Cosby | F01D 5/147 |
| | | | 416/231 B |
| 2019/0022698 A1 * | 1/2019 | Harner | B05D 5/005 |

* cited by examiner

LOW RADIUS RATIO FAN BLADE FOR A GAS TURBINE ENGINE

FIELD OF THE DISCLOSURE

This disclosure relates generally to gas turbines and, more particularly, to fan blades for a gas turbine engine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

Figure 1:
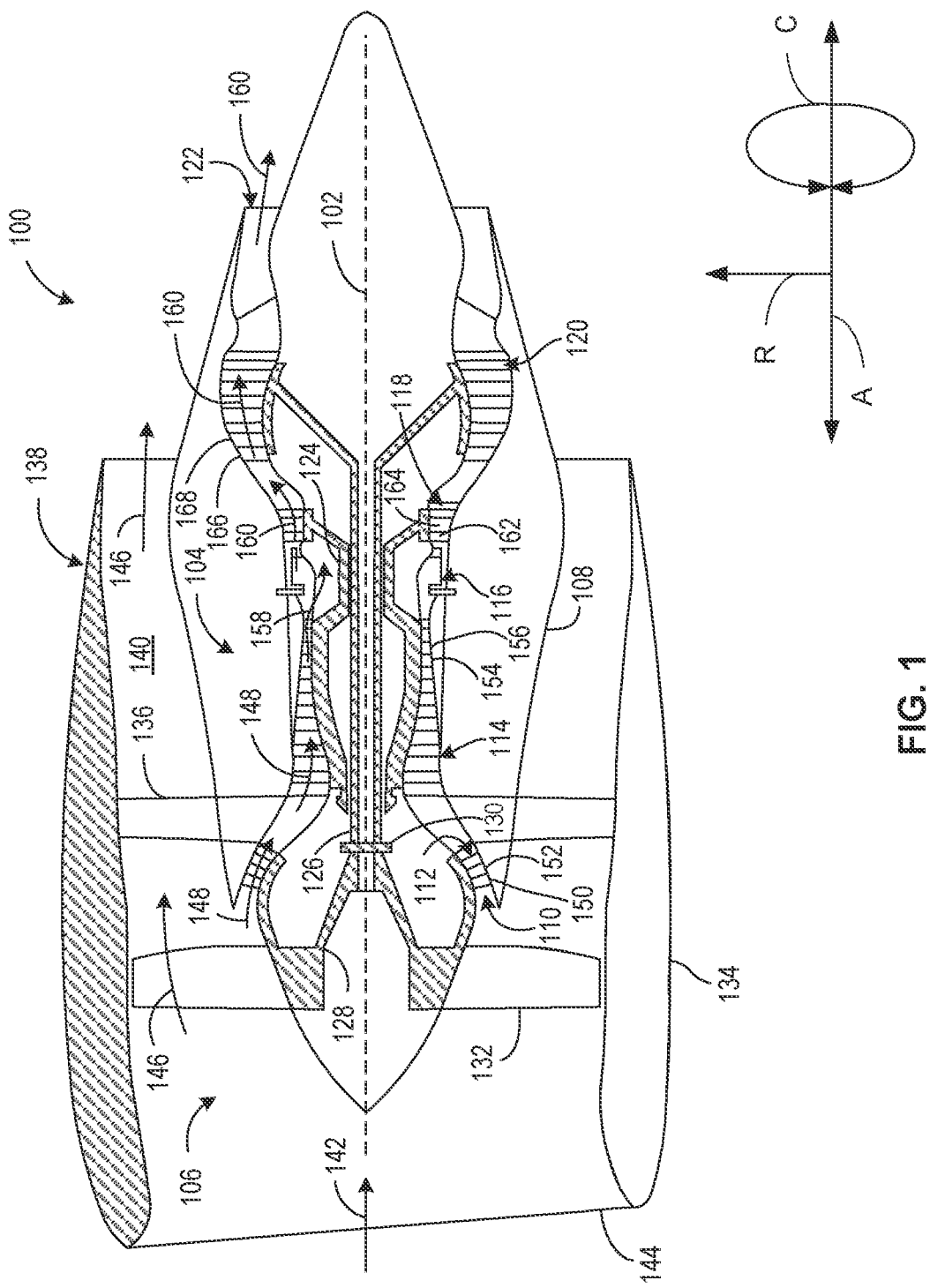
FIG. 1 illustrates an example gas turbine engine.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially the same size" refers to dimensions that may not be exactly identical due to manufacturing tolerances and/or other real world imperfections. Thus, unless otherwise specified, "substantially the same size" refers to +/−10 percent of a dimension. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

DETAILED DESCRIPTION

Many known technologies are directed to increasing gas turbine engine performance. Some known technologies are directed to decreasing the mass of a gas turbine engine while at least maintaining technical specifications and/or performance. For example, some technologies may be directed to increasing performance (e.g., thrust, fuel economy, etc.) of a gas turbine engine while maintaining a given package size (e.g., a diameter of a fan casing). An example technical specification of a gas turbine engine that effects performance is a radius ratio (e.g., the ratio of a radius of a hub of a fan section to the radius of a fan blade tip). It is desirable for the fan to have a smaller radius ratio because a smaller radius ratio increase fan inlet area for a given fan diameter, thus allowing for increased thrust. Examples disclosed herein can provide for a decreased radius ratio by utilizing a fan blade with a shortened blade root in order to lower a leading edge hub point.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe an example implementation and not to be taken limiting on the scope of the subject matter described in this disclosure. Certain features from different aspects of the following description may be combined to form yet new aspects of the subject matter discussed below.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the turbofan 100. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C. Additionally or alternatively, the attached figures are annotated with a set of axes including the roll axis R, the pitch axis P, and the yaw axis Y.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include a fan section proximate an intake of the engine. The fan section includes a plurality of circumferentially spaced apart fan blades. Each of the fan blades extends radially outward from a rotor disk or hub. Example fan blades include an airfoil and an integral dovetail at the airfoil root. The airfoil extends in a radial direction from the airfoil root to a blade tip. A surface of the airfoil extends in a chordwise direction from a leading edge to a trailing edge. A width of the airfoil defined by a distance between the leading edge and the trailing edge defines a flow path length of the airfoil. The fan blade dovetail is received in a complementary dovetail slot formed in the rotor disk. Example fan blades can be made of metal, such as titanium, or a composite material, such as a carbon-epoxy composite system.

In known fan blades, a length of the dovetail is approximately the same (e.g., within 10%) the width of the airfoil. A size (e.g., length, cross-sectional area, etc.) of the dovetail is proportionate to the force needed to retain the fan blade within the dovetail slot. The force needed to retain the fan blade within the dovetail slot is proportionate to parameters of the fan section and/or fan blade such as tip speed of the fan blade and weight of the fan blade. In some examples, the force needed to retain the fan blade is decreased. For example, the fan section of the gas turbine engine may have a reduced speed relative to a compressor or combustion section of the gas turbine engine due to implementation of a geared fan. In this example, the tip speed of the fan blade is reduced, thus reducing the force needed to retain the fan blade. In other examples, the fan blade may be reduced in weight by use of advanced materials (e.g., composite systems), thus reducing the force needed to retain the fan blade within the dovetail slot. In these examples, the size (e.g., length, cross-sectional area, etc.) of the dovetail can be reduced.

An inlet area of the fan is defined by the space between the rotor disk and the fan blade tips. As used herein, a radius ratio is a ratio of a radius of the rotor disk to a radius of the blade tips. As described above, decreasing the radius ratio allows for increased fan inlet area for a given fan diameter. In some examples, if the radius ratio is decreased, thrust can be increased for a given fan diameter. In other examples, if the radius ratio is decreased, a lower blade count can be implemented while maintaining engine performance, thus decreasing mass, complexity, cost, and fuel utilization of the engine. Examples disclosed herein reduce a radius ratio of a gas turbine engine fan by implementing a shortened dovetail length such that the axial dovetail length is less than the flow path length of the fan blade. Examples disclosed herein reduce a radius ratio of a gas turbine engine fan by implementing a fan blade with a leading edge hub point radially inward of an attachment pressure face.

Reference now will be made in detail to examples of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the annular inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan (e.g., turbofan 100), and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
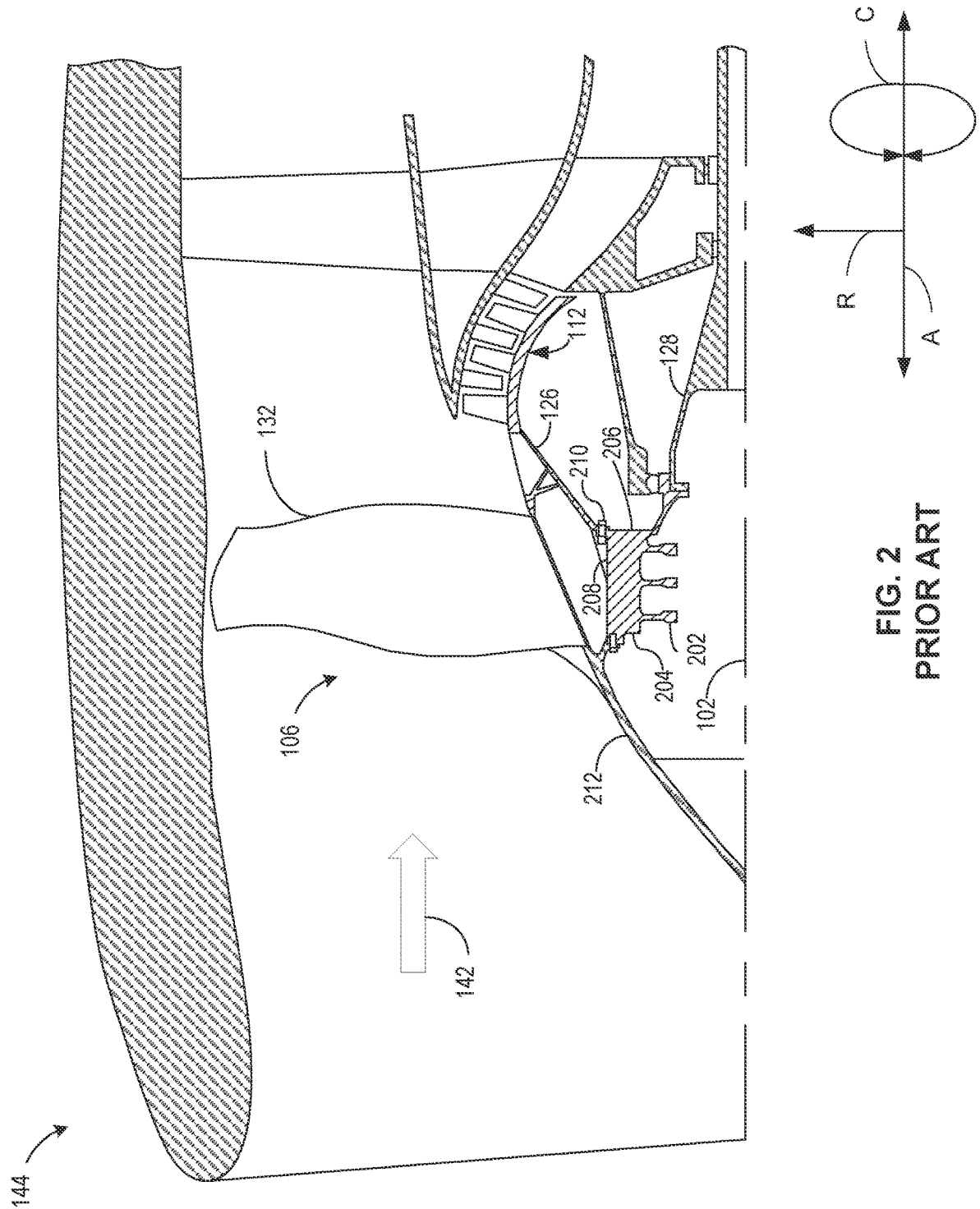
FIG. 2 illustrates an example cross-sectional side view of an inlet section of the example gas turbine engine.

FIG. 2 illustrates an example inlet portion 144 that can be implemented in the example turbofan 100 shown in FIG. 1. The example inlet portion 144 includes the fan section 106 which is rotated about the centerline axis 102 by the fan shaft 128 powered by the LP turbine 120 (not shown). The fan section 106 includes a rotor disk 202 from which extends radially outwardly a plurality of circumferentially spaced apart fan or rotor blades 132 (only one shown in FIG. 2). The fan blades 132 may be metallic or nonmetallic. For example, the fan blades 132 may be made from a carbon fiber-epoxy composite or other similar material. The rotor disk 202 includes a forward end 204 axially spaced from an aft end 206, and a radially outer surface 208 extending therebetween.

Disposed downstream of the fan section 106 is the LP compressor 112 having axially spaced apart vane and blade rows, with the blades thereof being joined to the LP shaft 126. In the illustrated example, the LP shaft 126 is fixedly joined to the aft end 206 of the rotor disk 202 by a plurality of bolts 210. A spinner 212 is joined to the forward end 204 of the rotor disk 202 to provide an aerodynamic flow path for the air 142 entering the fan section 106.

Figure 3:
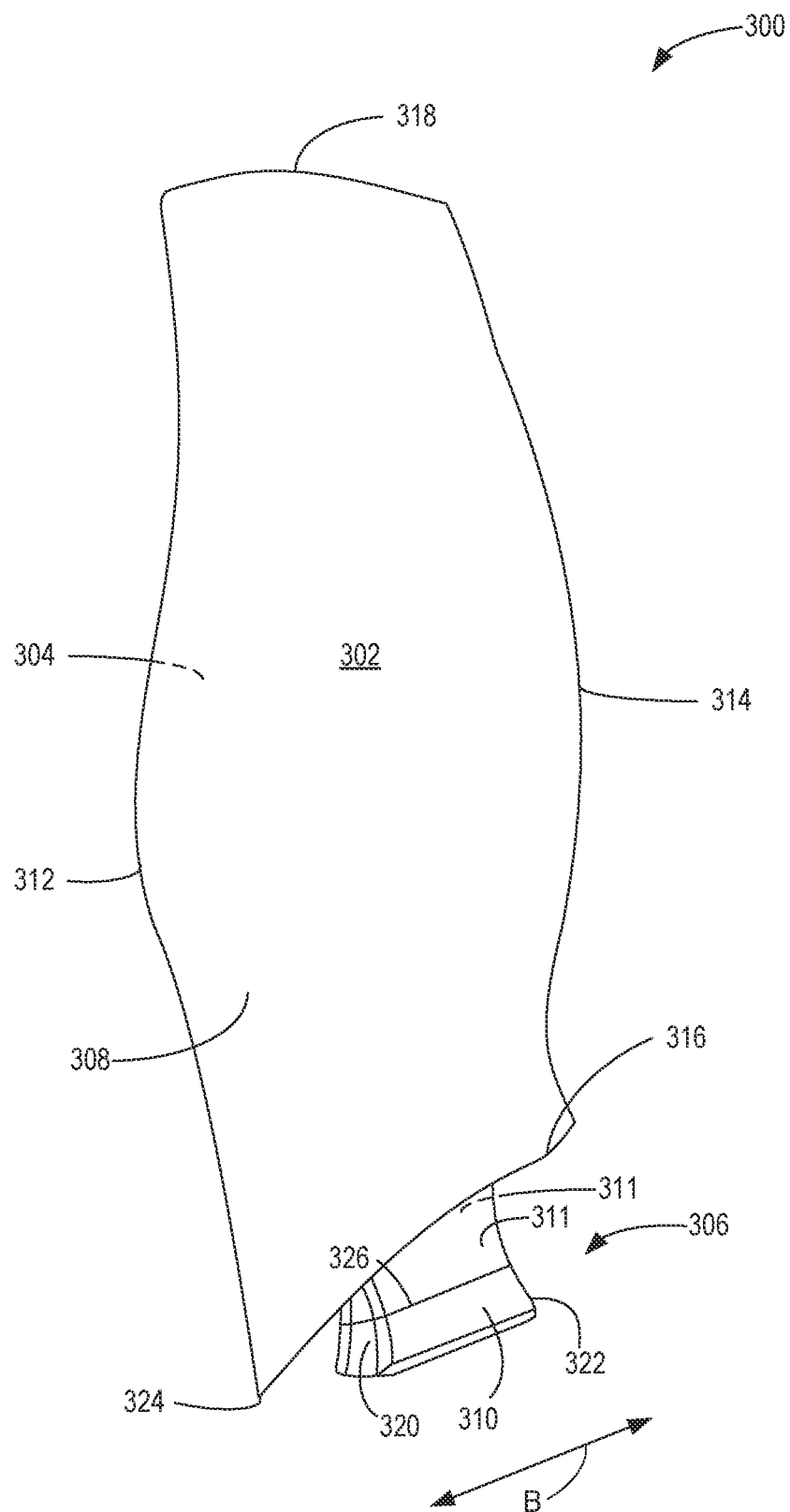
FIG. 3 illustrates an example fan blade.

FIG. 3 illustrates an example fan blade 300 that can be implemented in the inlet portion 144 of the turbofan 100 shown in FIGS. 1 and/or 2. The example fan blade 300 has a pressure side 302 and opposed suction side 304. The example fan blade 300 is an integral component including a root section 306 and an airfoil 308. The root section 306 includes a straight axial dovetail 310 with a pair of opposed pressure faces 311. When the fan blade 300 is assembled in a rotor disk (e.g., the rotor disk 202 depicted in FIG. 2), the axial dovetail 310 is disposed in a corresponding dovetail slot in the rotor disk (as shown, for example, in FIG. 5). While the example fan blade 300 of FIG. 3 includes the axial dovetail 310, other example fan blades can include a dovetail with a different geometry such as skewed axial, circular arc, etc. The axial dovetail 310 of FIG. 3 can represent a dovetail of any such geometry (e.g., skewed axial, circular arc, etc.).

Still referring to FIG. 3, the airfoil 308 of example fan blade 300 extends in a chordwise direction (e.g., along axis B) from a leading edge 312 to a trailing edge 314. Additionally, the example airfoil 308 extends in a spanwise or radial direction from a root 316 to a tip 318. The example fan blade 300 of FIG. 3 may be constructed from a variety of materials including metal, metal alloys, nonmetallic composites, and combinations thereof. In the illustrated example, the fan blade 300 is constructed from a composite material. The term "composite" refers generally to a material containing a reinforcement such as fibers or particles supported in a binder or matrix material. The composite may include a number of layers or plies embedded in a matrix and oriented substantially parallel to the pressure and suction sides 302, 304. An example of a suitable material is a carbonaceous (e.g., graphite) fiber embedded in a resin material such as epoxy. These are commercially available as fibers unidirectionally aligned into a tape that is impregnated with a resin. Such "prepreg" tape can be formed into a part shape, and cured via an autoclaving process or press molding to form a light weight, stuff, relatively homogeneous article.

As discussed above, during operation of a gas turbine engine (e.g., the turbofan 100), air (e.g., the air 142) enters an inlet portion (e.g., the inlet portion 144 of FIGS. 1 and/or 2) and flows substantially axially towards compressor, combustor, and/or turbine sections. As such, the air flows across rotor, stator, and/or fan blades in the gas turbine engine. For example, the air can flow across the example fan blade 300 when the fan blade 300 is mounted to a rotor disk (e.g., rotor disk 202 depicted in FIG. 2). As used herein, a flow path length is a distance the air flows across the fan blade 300. In the example of FIG. 3, the flow path length of the fan blade 300 is defined by a distance between the leading edge 312 and the trailing edge 314.

In the example of FIG. 3, the axial dovetail 310 includes a fore end 320 and an aft end 322. A length of the axial dovetail 310 is defined by a distance between the fore end 320 and the aft end 322. In known fan blades such as the fan blade 132 of FIG. 2, a fore end of an axial dovetail is aligned with a leading edge of an airfoil. In the example of FIG. 3, the fore end 320 of the axial dovetail 310 is disposed in a chordwise direction from the leading edge 312 toward the trailing edge 314. Similarly, in known fan blades such as the fan blade 132 of FIG. 2, an aft end of an axial dovetail is aligned with a trailing edge of an airfoil. In the example of FIG. 3, the aft end 322 of the axial dovetail 310 is disposed in a chordwise direction from the trailing edge 314 toward the leading edge 312. As a result, in the example of FIG. 3, the length of the axial dovetail 310 is less than (e.g., reduced by 30 percent) the flow path length of the airfoil 308. In some examples, the fore end 320 of the axial dovetail 310 can be disposed from the leading edge 312 of the airfoil 308 while the aft end 322 is aligned with the trailing edge 314. In these examples, the length of the axial dovetail 310 is also less than (e.g., reduced by 30 percent) the length of the airfoil 308. A hub point 324 of the leading edge 312 is defined by a radially innermost (e.g., closest to the centerline axis 102 of the turbofan 100) point of the leading edge 312. In the example of FIG. 3, the hub point 324 is radially inward of a top edge 326 of the pressure face 311 of the axial dovetail 310. In other words, the top edge 326 of the axial dovetail 310 is radially outward (e.g., further from the centerline axis 102 of the turbofan 100) compared to the hub point 324 of the leading edge 312.

Figure 4:
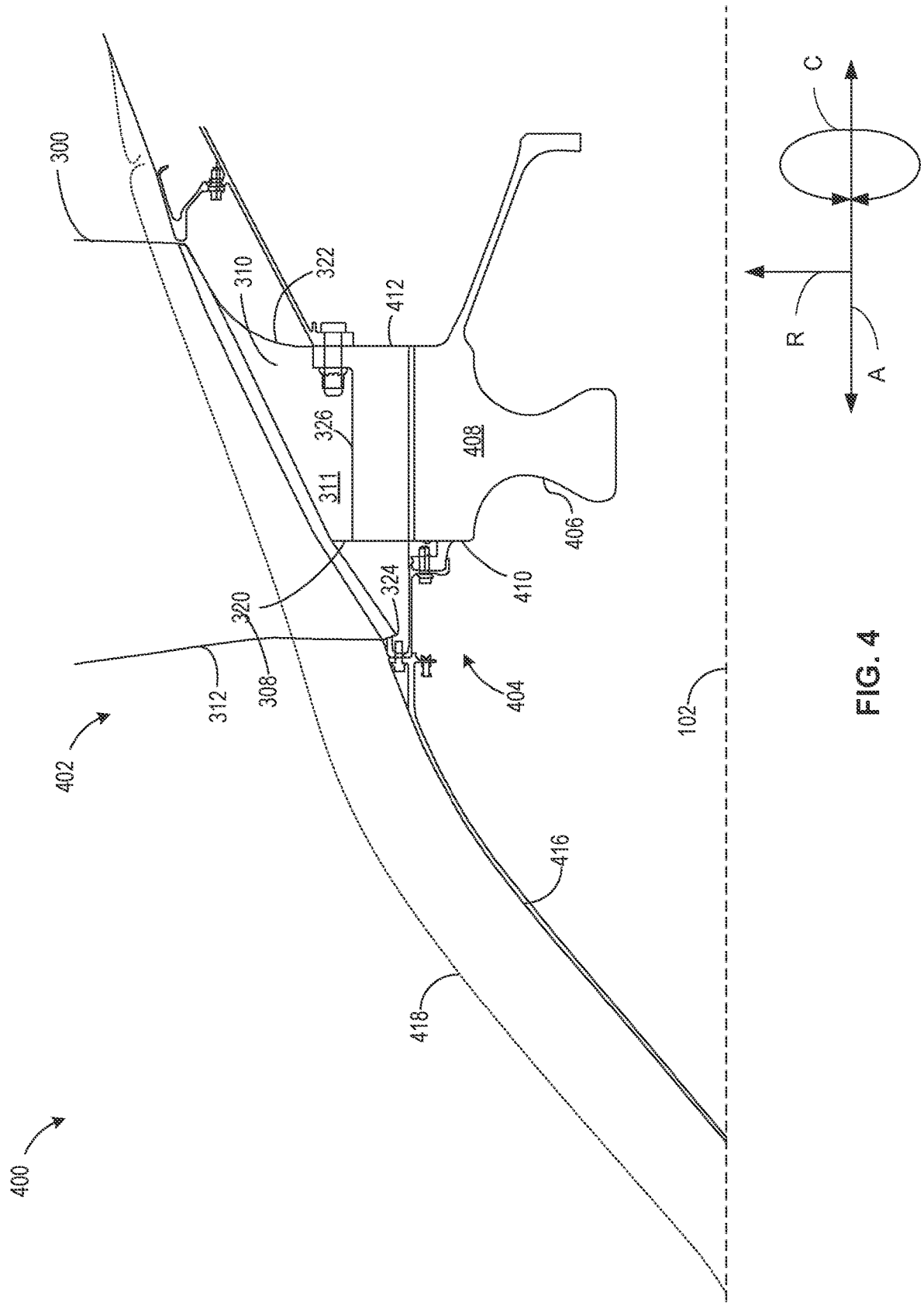
FIG. 4 illustrates an example cross-sectional side view of an inlet section of an example gas turbine engine including a portion of the example fan blade.

FIG. 4 illustrates an example cross-sectional side view of an inlet portion 400 of a turbofan including a portion of the fan blade 300 shown in FIG. 3. The example fan blade 300 disclosed herein can be implemented with the turbofan 100 of FIG. 1, for example. The example inlet portion 400 includes a fan section 402 which is rotated about the centerline axis 102 by a fan shaft (not shown) powered by a low pressure turbine (not shown). The fan section 402 includes a hub or rotor disk 406. The rotor disk 406 includes a body 408 extending axially from a forward surface 410 to an aft surface 412. The body 408 of the example rotor disk 406 includes a plurality of dovetail slots configured to receive the axial dovetails 310 of the fan blades 300. Each of the dovetail slots extend axially from the forward surface 410 to the aft surface 412. Thus, a length of each of the dovetail slots is a distance between the forward surface 410 and the aft surface 412. Additionally, a length of the body 408 is the distance between the forward surface 410 and the aft surface 412.

Extending radially from the rotor disk 406 is a plurality of the fan blades 300 (only one shown in FIG. 4) circumferentially spaced apart. The rotor disk 406 and the plurality of fan blades 300 form a rotor assembly 404. As illustrated in FIG. 4, the rotor assembly 404 is a portion of the fan section 402. In other examples, the rotor assembly 404 including the fan blades 300 is a portion of a compressor section (e.g., the LP compressor 112, the HP compressor 114) of the turbofan 100. In other examples, the rotor assembly 404 including the fan blades 300 is a portion of a turbine section (e.g., the HP turbine 118, the LP turbine 120) of the turbofan 100. The axial dovetail 310 of the fan blade 300 is disposed within the dovetail slot (e.g., dovetail slot 504 of FIG. 5) within the rotor disk 406. The forward surface 410 of the rotor disk 406 is aligned with the fore end 320 of the axial dovetail 310. Similarly, the aft surface 412 of the rotor disk 406 is aligned with the aft end 322 of the axial dovetail 310. As a result, the length of the dovetail slot is substantially (e.g., within 10 percent) the same as the length of the axial dovetail 310. Similarly, the length of the body 408 is substantially (e.g., within 10 percent) the same as the length of the axial dovetail 310. As described above in connection with FIG. 3, the length of the axial dovetail 310 is less than the flowpath length of the airfoil 308. As a result, the length of the body 408 of the rotor disk 406 is reduced (e.g., 30 percent less) compared to a length of a body of a known rotor disk (e.g., the rotor disk 202 of FIG. 2). As a result of the reduced length, the rotor disk 406 can have a reduced weight (e.g., 30 percent less) compared to a known rotor disk.

As described in connection with FIG. 3, the hub point 324 of the leading edge 312 is radially inward (e.g., closer to the centerline axis 102) of the top edge 326 of the pressure face 311 of the axial dovetail 310. As a result, a radius of the rotor disk 406 can be reduced. The reduced radius of the rotor disk 406 can result in a reduced weight compared to a known rotor disk. Additionally, the reduced radius can result in a reduced radius ratio for a gas turbine engine implementing the inlet portion 400 of FIG. 4. For example, a radially inner boundary of an air flowpath for the inlet portion 400 is illustrated by line 416. A radially inner boundary of an air flowpath for an inlet portion (e.g., the inlet portion 144) with known fan blades (e.g., the fan blades 132) is illustrated in FIG. 4 by line 418. In the example of FIG. 4, the flowpath for the air through the inlet portion 400 extends radially inner compared to the flowpath for the air though the inlet portion 144. As a result, given the same blade tip diameter for the inlet portion 400 of FIG. 4 and the inlet portion 144 of FIG. 2, a radius ratio of a gas turbine engine implementing the inlet portion 400 of FIG. 4 is reduced from a radius ratio of a gas turbine engine (e.g., the turbofan 100) implementing the inlet portion 144 of FIG. 2. As discussed above, in some examples, a reduced radius ratio can result in a technical effect of increased thrust for a given fan diameter. In other examples, with a reduced radius ratio, a lower blade count can be implemented while maintaining engine performance, thus decreasing mass, complexity, cost, and fuel utilization of the engine.

Figure 5:
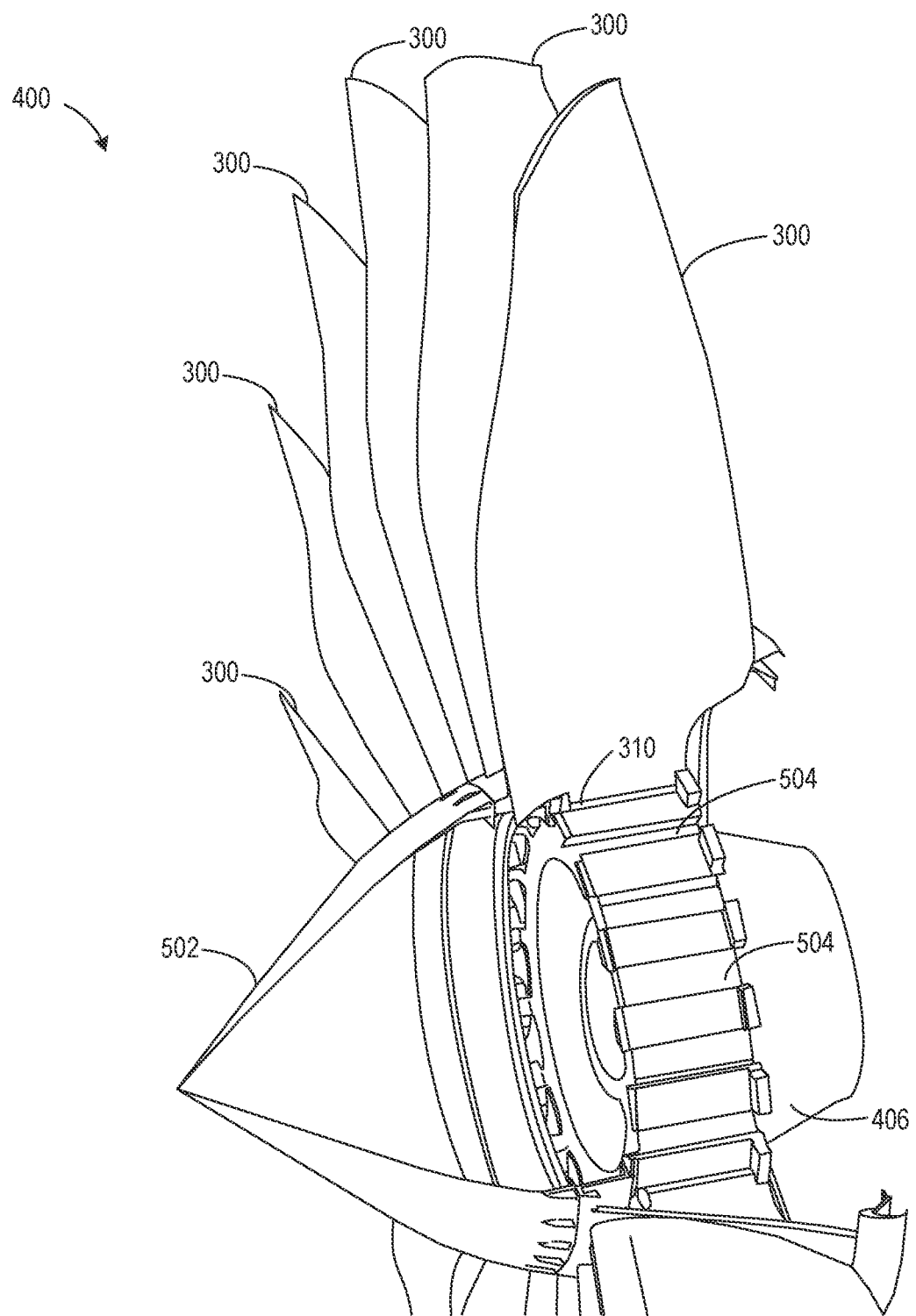
FIG. 5 illustrates a partial perspective side view of the example inlet section including a plurality of the example fan blade.

FIG. 5 illustrates the example inlet portion 400 of a turbofan including a plurality of the fan blades 300 shown in FIGS. 3 and/or 4. The example inlet portion 400 disclosed herein can be implemented with the turbofan 100 of FIG. 1, for example. The example inlet portion 400 includes a spinner 502 and the rotor disk 406. The example rotor disk 406 includes a plurality of dovetail slots 504. Each of the dovetail slots 504 is configured to receive the axial dovetail 310 of one of the fan blades 300. In an assembled configuration, each of the dovetail slots 504 receives an axial dovetail 310 of one of the fan blades 300. However, some of the fan blades are omitted from the illustration for the purposes of visualizing the dovetail slots 504. For the same reason, a portion of the spinner 502 is omitted.

In some examples, the apparatus includes means for pushing air. For example, the means for pushing air may be implemented by airfoil 308. In some examples, the apparatus includes means for assembling. For example, the means for assembling may be implemented by axial dovetail 310. In some examples, the apparatus includes means for combining. For example, the means for combining may be implemented by rotor disk 202. In some examples, the apparatus includes means for receiving. For example, the means for receiving may be implemented by dovetail slots 504.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities or/and steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide for fan blades for gas turbine engines which result in a reduced radius ratio of the gas turbine engine. The reduced axial dovetail length of the fan blades disclosed herein provide for a reduced rotor disk diameter and, thus, a reduced radius ratio of the gas turbine engine. The reduced radius ratio of the gas turbine engine provides a technical effect of increased performance (e.g., thrust) for a given fan diameter. Additionally or alternatively, the reduced radius ratio can provide a technical effect of reduced weight of the gas turbine engine while maintaining technical performance. In other examples, the reduced radius ratio provides a technical effect of reduced part count and/or complexity of the gas turbine engine while maintaining technical performance.

Example methods, apparatus, systems, and articles of manufacture to implement a low radius ratio fan blade for a gas turbine engine are disclosed herein. Further examples and combinations thereof include the following:

Example 1 includes a fan blade for a gas turbine engine, comprising an airfoil including a leading edge and a trailing edge extending between a root and a tip of the airfoil, a distance between the leading edge and the trailing edge defining a flow path length, a leading edge hub point defined by a radially innermost point of the leading edge; and an axial dovetail including a pair of opposed pressure faces, an axial length of the axial dovetail less than the flow path length, a top edge of the axial dovetail separating the pressure faces from the airfoil, the top edge of the axial dovetail radially outward of the leading edge hub point.

Example 2 includes the fan blade of any preceding clause, wherein the fan blade is formed from a composite material.

Example 3 includes the fan blade of any preceding clause, wherein the fan blade is formed from a metal or metal alloy.

Example 4 includes the fan blade of any preceding clause, wherein the axial length of the axial dovetail is from a fore end of the axial dovetail to an aft end of the axial dovetail.

Example 5 includes the fan blade of any preceding clause, wherein the fore end of the axial dovetail is offset axially from the leading edge of the airfoil.

Example 6 includes the fan blade of any preceding clause, wherein the aft end of the axial dovetail is offset axially from the trailing edge of the airfoil.

Example 7 includes a rotor assembly, comprising a rotor disk including a body including an array of dovetail slots; and an array of fan blades, each having an airfoil including a leading edge and a trailing edge, a distance between the leading edge and the trailing edge defining a flow path length, a leading edge hub point defined by a radially innermost point of the leading edge; and an axial dovetail including a pair of opposed pressure faces, an axial length of the axial dovetail less than the flow path length, a top edge of the axial dovetail separating the pressure faces from the airfoil, the top edge of the axial dovetail radially outward of the leading edge hub point.

Example 8 includes the rotor assembly of any preceding clause, wherein the rotor assembly is a portion of a fan section of a gas turbine engine.

Example 9 includes the rotor assembly of any preceding clause, wherein the rotor assembly is a portion of a compressor section of a gas turbine engine.

Example 10 includes the rotor assembly of any preceding clause, wherein the rotor assembly is a portion of a turbine section of a gas turbine engine.

Example 11 includes the rotor assembly of any preceding clause, wherein an axial length of each of the dovetail slots is less than the flow path length.

Example 12 includes the rotor assembly of any preceding clause, wherein an axial length of the rotor assembly is less than the flow path length.

Example 13 includes the rotor assembly of any preceding clause, wherein the axial length of the axial dovetail is from a fore end of the axial dovetail to an aft end of the axial dovetail.

Example 14 includes the rotor assembly of any preceding clause, wherein the fore end of the axial dovetail is offset axially from the leading edge of the airfoil.

Example 15 includes the rotor assembly of any preceding clause, wherein the aft end of the axial dovetail is offset axially from the trailing edge of the airfoil.

Example 16 includes a gas turbine engine, comprising a compressor; a combustion section; a turbine; a shaft to rotatably couple the compressor and the turbine; and a fan section, the fan section including a rotor disk including an array of dovetail slots; and an array of fan blades, each having an airfoil including a leading edge and a trailing edge, a distance between the leading edge and the trailing edge defining a flow path length, a leading edge hub point defined by a radially innermost point of the leading edge; and an axial dovetail including a pair of opposed pressure faces, an axial length of the axial dovetail less than the flow path length, a top edge of the axial dovetail separating the pressure faces from the airfoil, the top edge of the axial dovetail radially outward of the leading edge hub point.

Example 17 includes the gas turbine engine of any preceding clause, wherein the array of fan blades are to reduce a radius ratio of the gas turbine engine.

Example 18 includes the gas turbine engine of any preceding clause, wherein the axial length of the axial dovetail is from a fore end of the axial dovetail to an aft end of the axial dovetail.

Example 19 includes the gas turbine engine of any preceding clause, wherein the fore end of the axial dovetail is offset axially in a direction toward the compressor compared to an axial location of the leading edge of the airfoil.

Example 20 includes the gas turbine engine of any preceding clause, wherein the aft end of the axial dovetail is offset axially in a direction away from the compressor compared to an axial location of the trailing edge of the airfoil.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A fan blade for a gas turbine engine, comprising:
   an airfoil including a leading edge and a trailing edge extending between a root and a tip of the airfoil, a distance between the leading edge and the trailing edge defining a flow path length, a radially innermost point of the leading edge defining a leading edge hub point, an axially forwardmost point of the leading edge defining a forward leading edge point, the forward leading edge point positioned forward of the leading edge hub point, the leading edge hub point positioned proximal to a central axis of the gas turbine engine, the forward leading edge point positioned distal to the central axis of the gas turbine engine; and
   a root section including an axial dovetail having a pair of opposed pressure faces, an axial length of the axial dovetail less than the flow path length, the axial dovetail including a fore end and an aft end, a portion of the root of the airfoil extending axially between the fore end and the aft end, a top edge of the axial dovetail radially inward of the portion of the root of the airfoil, the top edge of the axial dovetail radially outward of the leading edge hub point.

2. The fan blade of claim 1, wherein the fan blade is formed from a composite material.

3. The fan blade of claim 1, wherein the fan blade is formed from a metal or metal alloy.

4. The fan blade of claim 1, wherein the axial length of the axial dovetail is from the fore end of the axial dovetail to the aft end of the axial dovetail.

5. The fan blade of claim 4, wherein the fore end of the axial dovetail is offset axially from the leading edge of the airfoil.

6. The fan blade of claim 4, wherein the aft end of the axial dovetail is offset axially from the trailing edge of the airfoil.

7. The fan blade of claim 1, wherein the airfoil and the root section are integral components, the airfoil including a first side and a second side opposite the first side, the first side of the airfoil integrated into a first pressure face of the axial dovetail, the second side of the airfoil integrated into a second pressure face of the axial dovetail.

8. A rotor assembly, comprising:
   a rotor disk including a body including an array of dovetail slots; and
   an array of fan blades including a first fan blade, the first fan blade including:
      an airfoil including a leading edge and a trailing edge extending between a root and a tip of the airfoil, a distance between the leading edge and the trailing edge defining a flow path length, a radially innermost point of the leading edge defining a leading edge hub point, an axially forwardmost point of the leading edge defining a forward leading edge point, the forward leading edge point positioned forward of the leading edge hub point, the leading edge hub point positioned proximal to a central axis of a gas turbine engine, the forward leading edge point positioned distal to the central axis of the gas turbine engine; and
      a root section including an axial dovetail having a pair of opposed pressure faces, an axial length of the axial dovetail less than the flow path length, the axial dovetail including a fore end and an aft end, a portion of the root of the airfoil extending axially between the fore end and the aft end, a top edge of the axial dovetail radially inward of the portion of the root of the airfoil, the top edge of the axial dovetail radially outward of the leading edge hub point.

9. The rotor assembly of claim 8, wherein the rotor assembly is a portion of a fan section of the gas turbine engine.

10. The rotor assembly of claim 8, wherein the rotor assembly is a portion of a compressor section of the gas turbine engine.

11. The rotor assembly of claim 8, wherein the rotor assembly is a portion of a turbine section of the gas turbine engine.

12. The rotor assembly of claim 8, wherein an axial length of respective dovetail slots of the array of dovetail slots is less than the flow path length.

13. The rotor assembly of claim 8, wherein an axial length of the body of the rotor disk is less than the flow path length.

14. The rotor assembly of claim 8, wherein the axial length of the axial dovetail is from the fore end of the axial dovetail to the aft end of the axial dovetail.

15. The rotor assembly of claim 14, wherein the fore end of the axial dovetail is offset axially from the leading edge of the airfoil.

16. The rotor assembly of claim 14, wherein the aft end of the axial dovetail is offset axially from the trailing edge of the airfoil.

17. A gas turbine engine, comprising:
a compressor;
a combustion section;
a turbine;
a shaft to rotatably couple the compressor and the turbine; and
a fan section, the fan section including:
  a rotor disk including an array of dovetail slots; and
  an array of fan blades including a first fan blade, the first fan blade including:
    an airfoil including a leading edge and a trailing edge extending between a root and a tip of the airfoil, a distance between the leading edge and the trailing edge defining a flow path length, a radially innermost point of the leading edge defining a leading edge hub point, an axially forwardmost point of the leading edge defining a forward leading edge point, the forward leading edge point positioned forward of the leading edge hub point, the leading edge hub point positioned proximal to a central axis of the gas turbine engine, the forward leading edge point positioned distal to the central axis of the gas turbine engine; and
    a root section including an axial dovetail having a pair of opposed pressure faces, an axial length of the axial dovetail less than the flow path length, the axial dovetail including a fore end and an aft end, a portion of the root of the airfoil extending axially between the fore end and the aft end, a top edge of the axial dovetail radially inward of the portion of the root of the airfoil, the top edge of the axial dovetail radially outward of the leading edge hub point.

18. The gas turbine engine of claim 17, wherein the array of fan blades are to reduce a radius ratio of the gas turbine engine.

19. The gas turbine engine of claim 17, wherein the axial length of the axial dovetail is from the fore end of the axial dovetail to the aft end of the axial dovetail.

20. The gas turbine engine of claim 19, wherein the fore end of the axial dovetail is offset axially in a direction toward the compressor compared to an axial location of the leading edge of the airfoil.

21. The gas turbine engine of claim 19, wherein the aft end of the axial dovetail is offset axially in a direction away from the compressor compared to an axial location of the trailing edge of the airfoil.

* * * * *